(12) United States Patent
Willard et al.

(10) Patent No.: US 9,570,112 B2
(45) Date of Patent: Feb. 14, 2017

(54) MULTIPLE VIEWS RECORDING

(71) Applicant: OpenTV, Inc., San Francisco, CA (US)

(72) Inventors: Pierre Willard, Palo Alto, CA (US); Amarendra N. Gogoi, Fremont, CA (US); Chandrika Kasi, San Jose, CA (US)

(73) Assignee: OpenTV, Inc., San Francisco, CA (US)

( * ) Notice: Subject to any disclaimer, the term of this patent is extended or adjusted under 35 U.S.C. 154(b) by 427 days.

(21) Appl. No.: 14/136,721

(22) Filed: Dec. 20, 2013

(65) Prior Publication Data

US 2015/0179226 A1    Jun. 25, 2015

(51) Int. Cl.
| | |
|---|---|
| *H04N 9/80* | (2006.01) |
| *G11B 27/28* | (2006.01) |
| *H04N 21/433* | (2011.01) |
| *H04N 5/76* | (2006.01) |
| *H04N 9/82* | (2006.01) |
| *H04N 21/432* | (2011.01) |

(52) U.S. Cl.
CPC .............. *G11B 27/28* (2013.01); *H04N 5/76* (2013.01); *H04N 9/8205* (2013.01); *H04N 21/4325* (2013.01); *H04N 21/4334* (2013.01)

(58) Field of Classification Search
CPC . G11B 27/28; H04N 21/4325; H04N 21/4334; H04N 5/76
USPC .......................... 386/213, 292, 294, 295, 248
See application file for complete search history.

(56) References Cited

U.S. PATENT DOCUMENTS

| | | | | |
|---|---|---|---|---|
| 5,892,848 | A * | 4/1999 | Nishiwaki | ........ G11B 20/10527 382/232 |
| 7,848,618 | B2 | 12/2010 | Potrebic et al. | |
| 8,997,153 | B2 * | 3/2015 | Templeman | ........... H04N 5/782 725/37 |
| 2004/0013409 | A1 * | 1/2004 | Beach | ..................... H04N 5/782 386/260 |
| 2005/0157183 | A1 * | 7/2005 | Iijima | .................. G11B 27/032 348/220.1 |
| 2009/0142041 | A1 * | 6/2009 | Nagasawa | .......... H04N 13/0033 386/341 |

(Continued)

FOREIGN PATENT DOCUMENTS

| | | | |
|---|---|---|---|
| WO | WO-2007057852 | A2 | 5/2007 |
| WO | WO-2015095827 | A2 | 6/2015 |
| WO | WO-2015095827 | A3 | 6/2015 |

OTHER PUBLICATIONS

"International Application Serial No. PCT/US2014/071726, International Search Report mailed Mar. 20, 2015", 2 pgs.

(Continued)

*Primary Examiner* — Helen Shibru
(74) *Attorney, Agent, or Firm* — Schwegman Lundberg & Woessner, P.A.

(57) ABSTRACT

A system and method for providing multiple views recording is provided. In example embodiments, an indication to record serial events including a first event and a second event on a same channel is received. A recording stream is started at a beginning of the first event and ends at an end of the second event. View markings are inserted in the recording stream that differentiate a first view corresponding to the first event from a second view corresponding to the second event. Thus, the recording stream creates a single file that contains multiple views. The single file is stored for later playback.

20 Claims, 8 Drawing Sheets

(56) References Cited

U.S. PATENT DOCUMENTS

2010/0247067 A1    9/2010  Gratton
2011/0170687 A1*  7/2011  Hyodo .................. H04L 9/0637
                                                             380/200

OTHER PUBLICATIONS

"International Application Serial No. PCT/US2014/071726, Written Opinion mailed Mar. 20, 2015", 6 pgs.

* cited by examiner

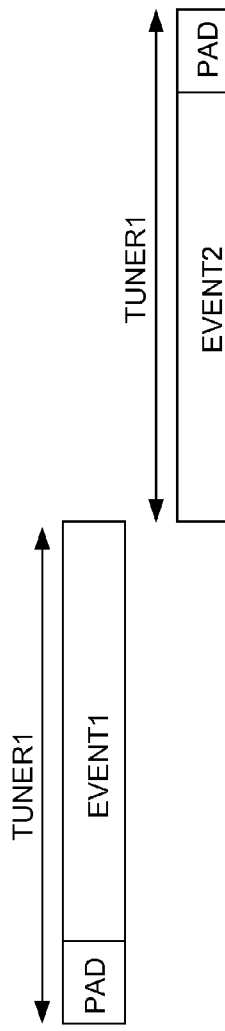
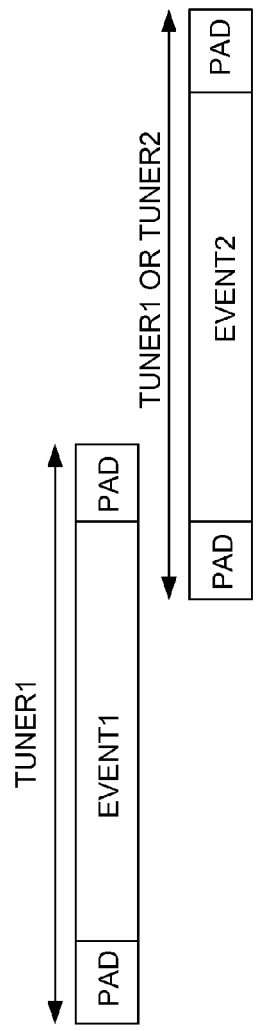
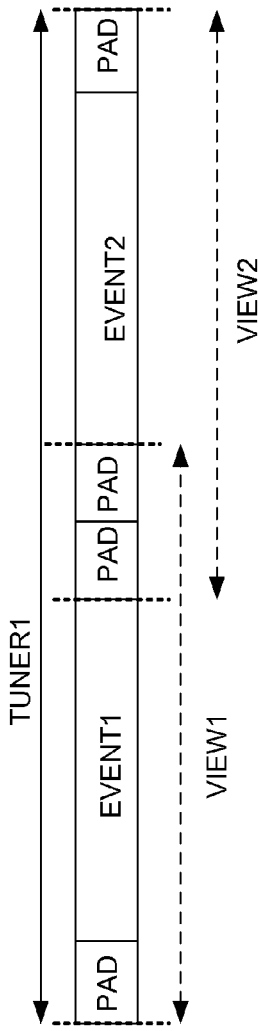

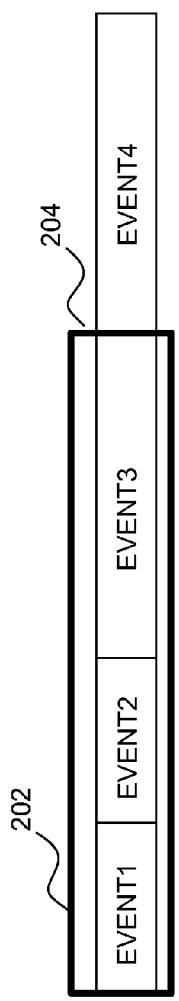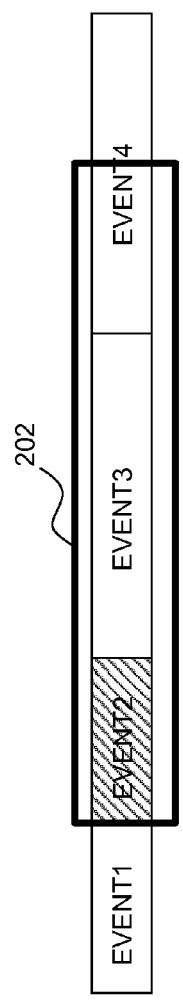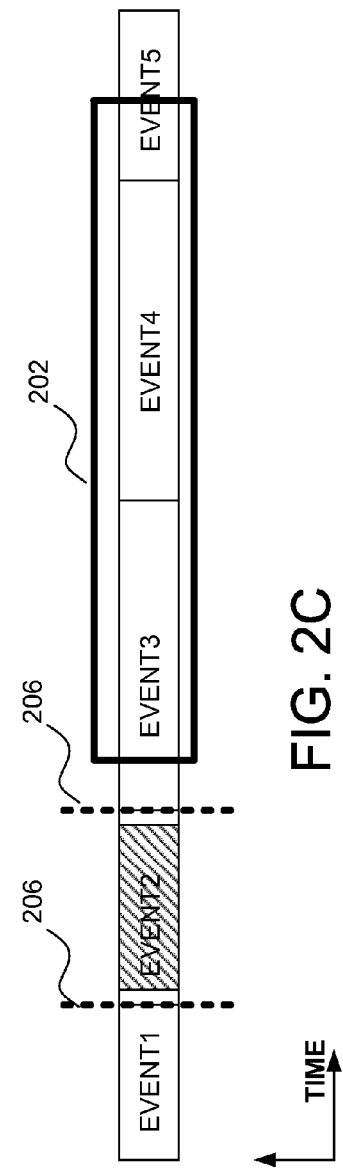

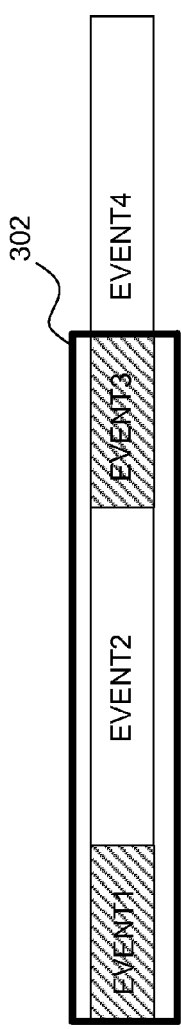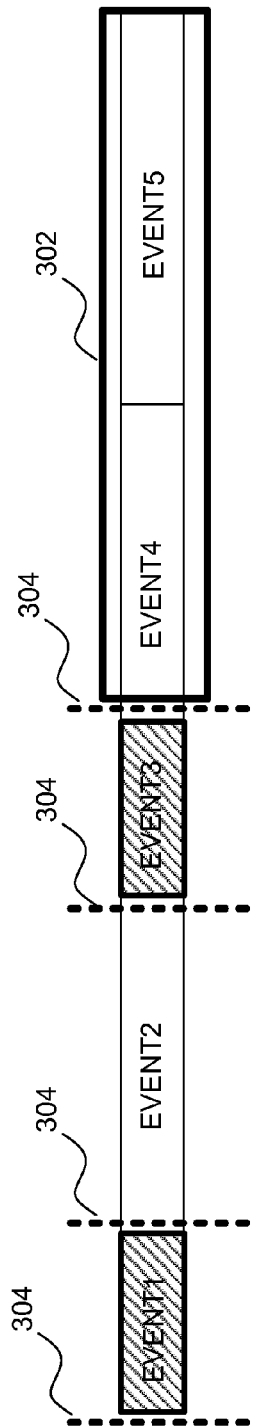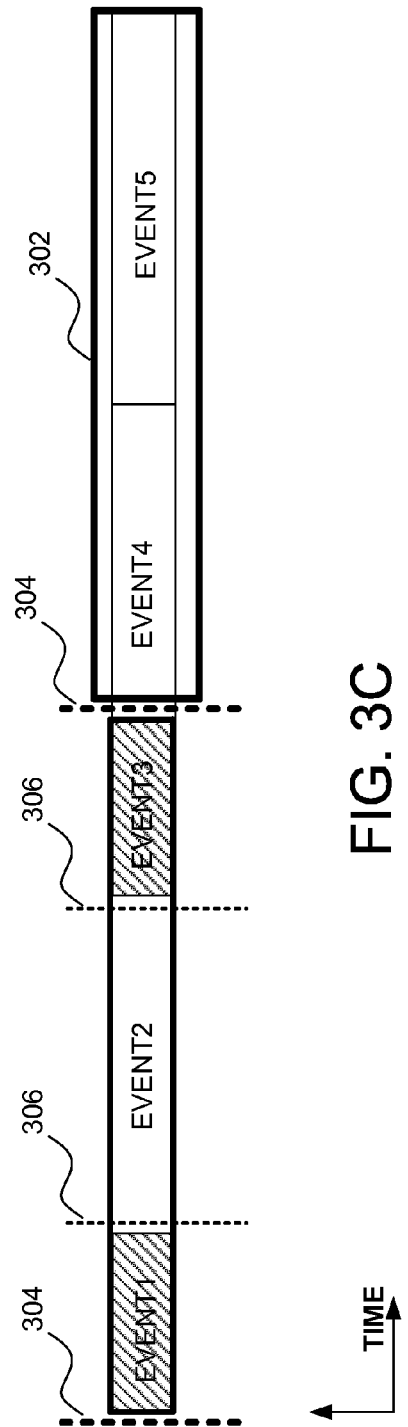

US 9,570,112 B2

MULTIPLE VIEWS RECORDING

FIELD

The present disclosure relates generally to providing video content recording, and in a specific example embodiment, to providing multiple views recording.

BACKGROUND

Conventionally, when a user desires to record two events (e.g., television shows) back-to-back, two different files are created—one for the first event and one for the second event. Because it is desirable to add padding to a beginning and end of a scheduled event, the two different files contain overlapping portions. Additionally, two tuners may be needed in order to record two back-to-back events with appropriate padding since the padding at the end of the first event overlaps with the padding at the beginning of the second event.

BRIEF DESCRIPTION OF DRAWINGS

Various ones of the appended drawings merely illustrate example embodiments of the present invention and cannot be considered as limiting its scope.

FIGS. 1A-C are diagrams illustrating a comparison of conventional recording versus multiple views recording.

FIGS. 2A-C are diagrams illustrating an example generation of a file from a review buffer.

FIGS. 3A-C are diagrams illustrating another example generation of a file from a review buffer.

DETAILED DESCRIPTION

Figure 4:
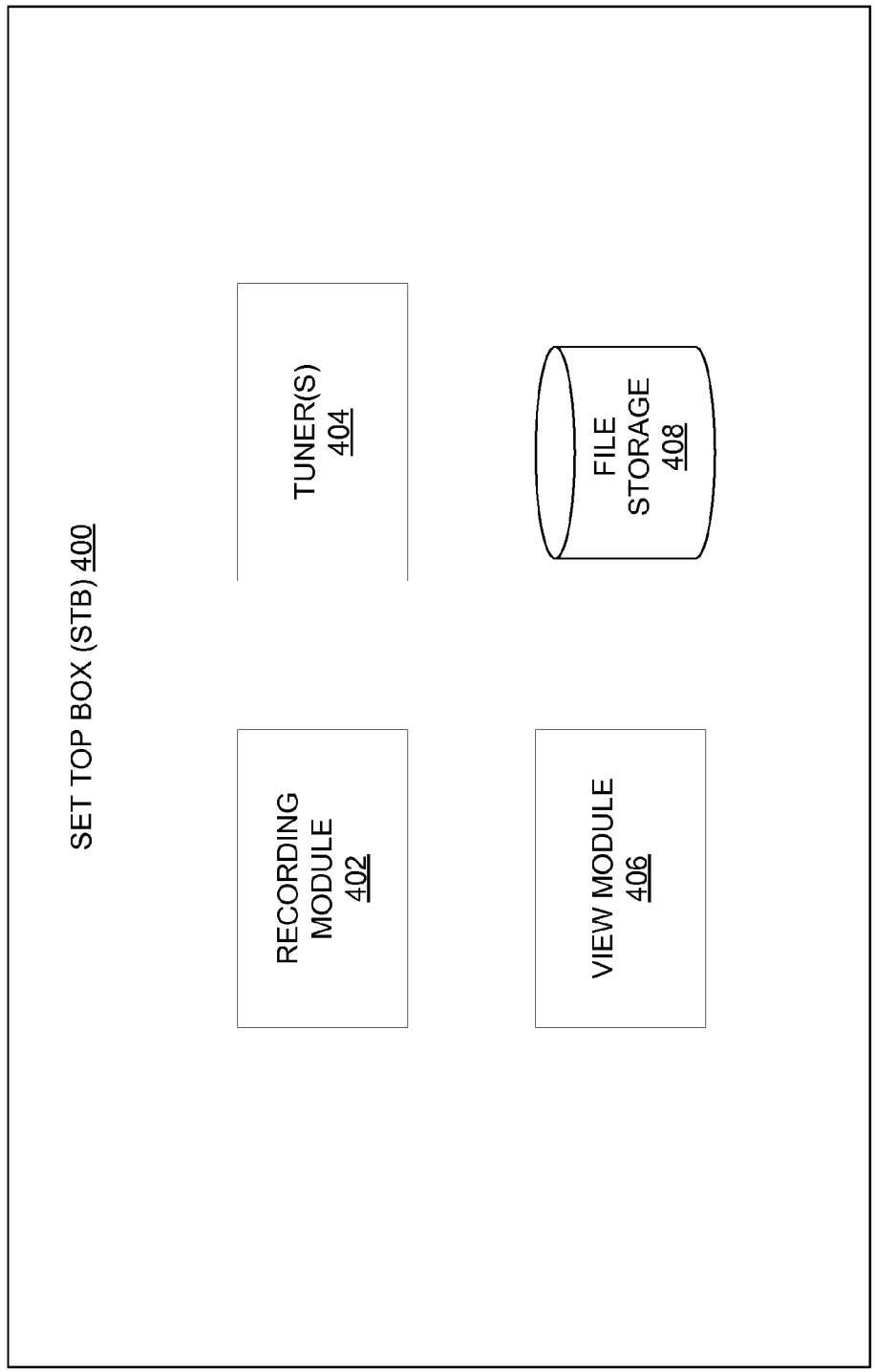
FIG. 4 is a block diagram illustrating an example embodiment of a set top box for providing multiple views recording.

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Example embodiments described herein provide systems and methods for providing multiple views recording. In example embodiments, an indication to record serial events including a first event and a second event on a same channel is received. A recording stream is started at a beginning of the first event and ends at an end of the second event. In example embodiments, the recording stream may be made up of several elementary streams. For example the elementary streams may include a video elementary stream, one or more audio elementary stream (e.g., one audio elementary stream per language), and other types of elementary streams. View markings are inserted in the recording stream that differentiate a first view corresponding to the first event from a second view corresponding to the second event. The view markings may include padding added to the first and second events. Thus, the recording stream creates a single file that contains multiple views. The single file is stored for later playback.

In a further embodiment, an indication to record one or more events contained within a review buffer is received. A point to split a file containing at least one event of the one or more events from the review buffer is determined. The point may correspond to an end (with padding) of one of the one or more events. The file that contains the at least one event from the review buffer is split based on the determination. The file is stored into a file storage for later playback.

As such, some example embodiments are directed to back-to-back or serial recording of two events (e.g., two television shows or other programming content) on a same channel by a set-top box (STB). Typically when recording an event, padding is desired in case the event starts earlier or ends later than scheduled (e.g., in an electronic program guide; "EPG"). For example, the recording of the event may begin a predetermined pad time (e.g., a front pad time of 1-5 minutes) before the scheduled event and/or end a second predetermined pad time (e.g., a rear pad time of 1-5 minutes) after the scheduled event ends.

FIGS. 1A-C are diagrams illustrating a comparison of conventional recording versus an example multiple views recording embodiment. With padding, recording streams of the two serial events will overlap. That is padding at the end of a recording stream for the first event will overlap padding at a beginning of a recording stream of the second event. This may cause a conflict in the system. Accordingly, overlapping padding in the two recording streams may not be recorded if only a single tuner is available. FIG. 1A shows a conventional single tuner recording process. In the example of FIG. 1A, a single tuner (tuner1) may add padding to the beginning of a recording stream of event1, but refrain from adding padding to the end of the recording stream of event1 since tuner1 must, instead start recording event2. However, tuner1 may add padding to the end of the recording stream of event2. The result of the recording process in FIG. 1A is two files with incomplete padding (e.g., no padding at the end of the first recording stream or beginning of the second recording stream) that are stored separately.

However, if two tuners are available for recording, then, as shown in FIG. 1B, the first turner (tuner1) may record event1 with sufficient padding at the beginning and end of the recording stream of event1. Similarly, a second tuner (tuner1) may record event2 with sufficient padding at the beginning and end of the recording stream of event2. Alternatively, recording of event1 and event2 by a single tuner (tuner1) may be possible in limited cases when shared between the two events. In these cases, the overlapping padding may be duplicated (e.g., copied) by tuner1 in the two recording streams. However, using a single tuner1 to generate two different recording streams may not be supported by hardware in the STB. Additionally, the hardware may have limitations (e.g., max N streams). Furthermore, the result of the recording process of FIG. 1B is still two files with a duplicated portion in both (e.g., the overlapping padding). Therefore, even though the recording streams are from the same channel, in order to record both streams with sufficient padding, more resources are needed. Such resources may include tuners, demultiplexers, storage space, and CPU processing power (e.g., to copy portions of the recording stream).

As such, example embodiments provide multiple views recording as shown in the example of FIG. 1C. A same tuner (tuner1) may continuously record a single stream that includes multiple events. The recording of an event (or multiple events) inside a stream that starts and ends at a specific time with appropriate padding may be referred to as a "view." As such, a resulting file of the recording stream may comprise one or more views (e.g., multiple views) created using less resources. The resulting file may contain view markings that indicate the beginning and end of each event along with the appropriate padding (e.g., mark the views). During playback of an event, the STB will know where the event starts and ends in the single file (including padding) based on the view markings. It is noted that while FIG. 1C illustrates two overlapping views in the recording stream, any number of overlapping views may be present in the recording stream (e.g., views for event1, event 2, event 3, and so on).

FIGS. 2A-C are diagrams illustrating an example generation of a file from a review buffer. The review buffer is a temporary recording of what the user is currently watching that provides views of past events for a predetermined amount of time (e.g., 2 hours). Typically, the review buffer records, in the background, for the predetermined amount of time (e.g., 2 hours) events on a same channel that the user is watching. Using the review buffer, the user can pause, rewind, and re-view portions of a current or past event. For example, the user can rewind "live" television for two hours (or the length of time permitted by the review buffer). Referring to FIG. 2A, a review buffer 202 is shown. The review buffer 202 provides views of event1, event2, and event3. A front end 204 of the review buffer 202 may record what the user is currently, in real-time, viewing. Assuming that the review buffer 202 is 2 hours long, event1 and event 2 may be half hour events while event3 and event4 may be full hour events.

FIG. 2B illustrates the review buffer 202 approximately a half hour later than that shown in FIG. 2A. A recording stream of the review buffer 202 has dropped the recording of event1 and, instead, is recording a portion of event4. Anytime during a period of the review buffer (e.g., within a 2 hour window of the review buffer 202), a user may indicate a desire to record, for later playback, an event in a portion of the review buffer 202. In the example shown in FIG. 2B, the user has indicated a desire to record event2 (as indicated by shading). Even though event2 occurred roughly 1.5 hours in the past, because a recording or view of event2 still exists in the review buffer 202, the STB can create a file that includes the view of event2 from the review buffer 202.

Referring now to FIG. 2C, the review buffer 202 has advanced in time to record portions of event3, event4, and events. Since the review buffer 202 has advanced past an end of event2, the recording of event2 may be split or detached (shown by split lines 206) from the review buffer 202 (with sufficient padding). The recording of event2 may then be stored as a file for later viewing. It is noted that the file containing event2 is not a copy of the review buffer, but instead, is just a saved portion of the review buffer 202. Because copying does not need to be performed, resources may be saved (e.g., CPU processing power).

FIGS. 3A-C are diagrams illustrating another example generation of a recording from a review buffer 302. While the example shown in FIG. 2 recorded a single event for later playback from the review buffer 202, the example of FIG. 3 is directed to recording multiple events from the review buffer 302. For example, FIG. 3A illustrates that a user has indicated a desire to record event1 and event3 for later playback.

In one embodiment, the STB may split the file for each desired event once the review buffer 302 has advanced past the end of the event (with sufficient padding). As shown in FIG. 3B, a first file may be created from the review buffer 302 at the end of event1 and a second file may be created from the review buffer 302 at the end of event3. The two files are distinguished by the split lines 304. It is noted that the files may contain the appropriate padding at the beginning and end of the event.

In an alternative embodiment, the STB may split the file for the two desired events at the end of the second desired event as shown in FIG. 3C. As such, a single file as indicated by the split lines 304 may be created from the review buffer 302 that includes a view for event1 and a view for event3. The view for event1 and event3 may be differentiated in the file by view markings 306 to indicate an end or begin (with appropriate padding) for each event. In a further embodiment, a view of event2 may be removed from the file to condense the file and reduce storage requirements.

It is noted that for the examples discussed in FIGS. 2 and 3, the view markings 306 may be inserted into the review buffer 202 or 302 while the review buffer 202 or 302 still retains the events being recorded for later playback. These view markings 306 may be used by the STB to split or detach the recording to create the file(s). Because copying does not need to be performed, resources may be saved (e.g., CPU processing power).

In example embodiments, an event may be defined by the EPG by a start time and end time on a specific channel. As such, the user may indicate a triplet of information (e.g., start time, end time, and channel information) in order to record the event. For example, the user may indicate to record channel X from 9 pm to 11 pm (plus possible padding). The event may then comprise programming content from 9 pm to 11 pm on channel X. The use may then indicate to record channel X from 8 pm to 10 pm. In this case, the event may comprise programming content from 8 pm to 10 pm on channel X. In this case, the views within the recording stream (of the events) overlap for 1 hour of programming content (plus padding). Therefore, overlaps in views may include more than just overlapping padding (e.g., at least overlapping padding, but may include overlaps in part of the event programming content).

FIG. 4 is a block diagram illustrating an example embodiment of a set top box (STB) 400 for providing multiple views recording. The STB 400 generates files with multiple views or generates a file from a review buffer (e.g., separating at least one view from the views of the review buffer) with reduction in use of resources. Accordingly, the STB 400 may comprise a recording module 402, at least one tuner 404, a view module 406, and file storage 408 all communicatively coupled together. It is noted that other components not necessary to describe example embodiments may also be included in the STB 400 (e.g., decoders, demultiplexers, processors, modulators).

The recording module 402 manages the recording of streams by each tuner 404 including review buffers. In example embodiments, the recording module 402 may receive an indication of one or more events that a user wants to record. The recording module 402 may instruct the tuner 404 to record the one or more events using a single recording stream that results in a single file. If multiple views (e.g., recordings of multiple events) are within the single file, the recording module 402 may insert view markings at a beginning and end for each desired event that may include appropriate padding. The generated file is then stored to the file storage 408 for later playback.

Additionally, the recording module 402 may split or detach a file containing a desired event from a review buffer. By splitting the file from the review buffer, instead of copying a portion of the review buffer, the recording module 402 reduces use of resources (e.g., CPU processing power required to copy and store large bites of data). The generated file is stored to the file storage 408 for later playback. It is noted that while example embodiments describe the tuner 404 as recording the events, in alternative embodiments, a separate component of the STB 400 may perform the recording operation.

The view module 406 manages the playback of views from stored files. Accordingly, the view module 406 may receive a request from a user to playback a particular event. The view module 406 accesses the file storage 408 to obtain the corresponding file that contains the event. Assuming the file contains more than one event, and as such contains multiple views, the view module 406 determines locations of the view markings that correspond to the requested event. The view module 406 then causes presentation of the view (and only of that view), as indicated by the view markings, for the event. The view may include padding at a beginning and/or end of the event.

It is noted that while the file storage 408 is shown to be a part of the STB 400, in alternative embodiments, the file storage 408 may be located elsewhere. For example, the file storage 408 may be located in a "cloud" or be at a service provider location.

Figure 5:
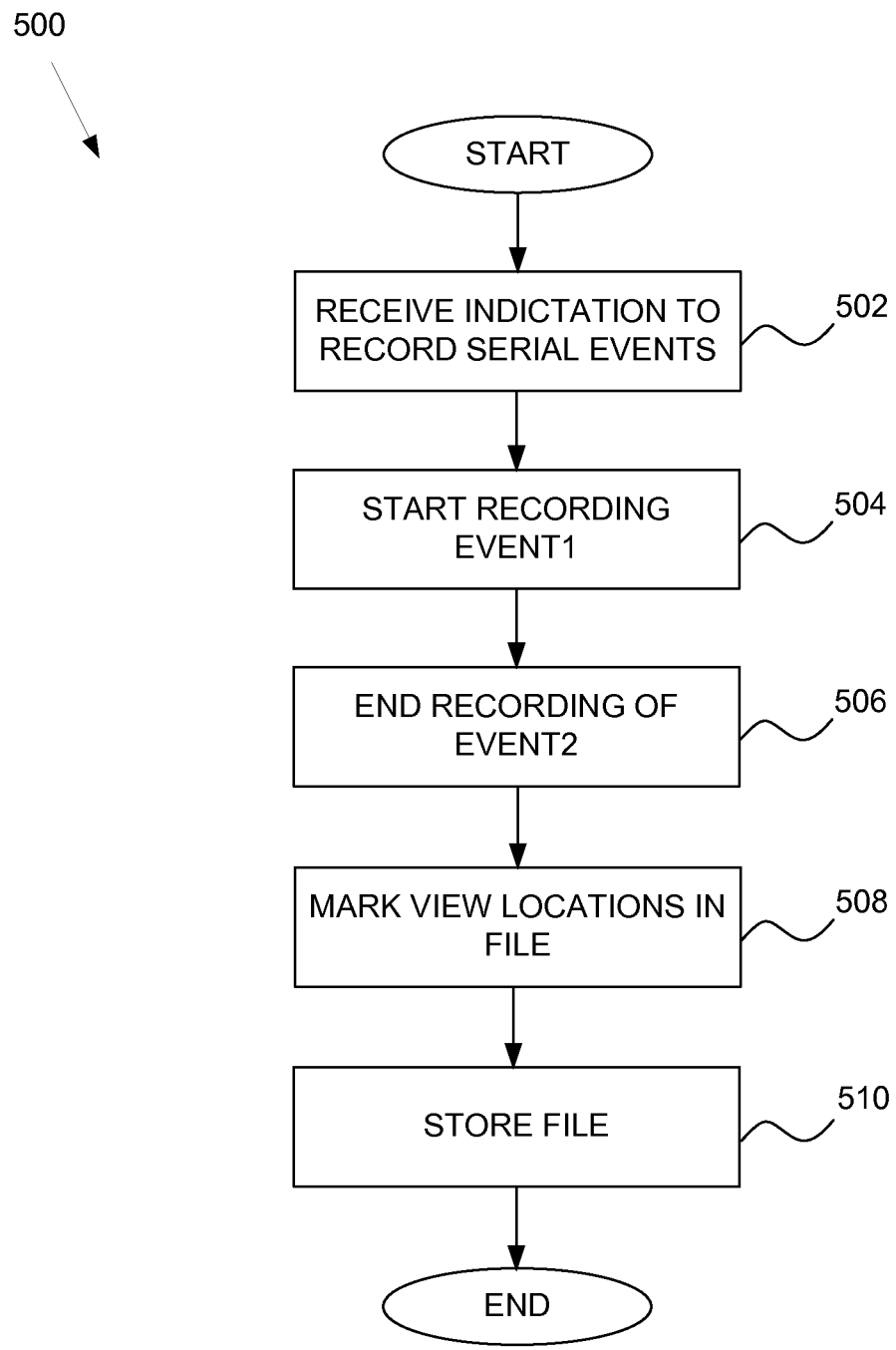
FIG. 5 is a flow diagram of an example method for generating a multiple views recording.

Referring now to FIG. 5, a flow diagram of an example method 500 for generating a multiple views recording is shown. The operations of the method 500 may be performed by components of the STB 400. In operation 502, an indication to record serial events is received. In example embodiments, the recording module 402 may receive a request from a user to record at least two events that are back-to-back on a same channel.

In operation 504, the STB 400 starts to record a first event (event1). The recording may be performed by the tuner 404. The corresponding recording stream may include a front padding added to the beginning of event1. The tuner 404 may continue the recording stream through the end of event1 and beginning of a second event (event2). At operation 506, recording may stop at an end of event2. In example embodiments, padding may be added to the end of event2 in the recording stream.

In operation 508, views corresponding to event1 and event2 may be marked with view markings to indicate where a view of event 1 starts and ends and where a view of event2 starts and end in a file created from the recording stream. The view markings may be inserted by, for example, the recording module 402 into the recording stream that constitutes the file. It is noted that while the method 500 indicates that the view markings are inserted after the recording is completed, example embodiments may insert the view markings on-the-fly during the recording of the events. The file with appropriate view markings is stored to the file storage 408 for later playback in operation 510.

Figure 6:
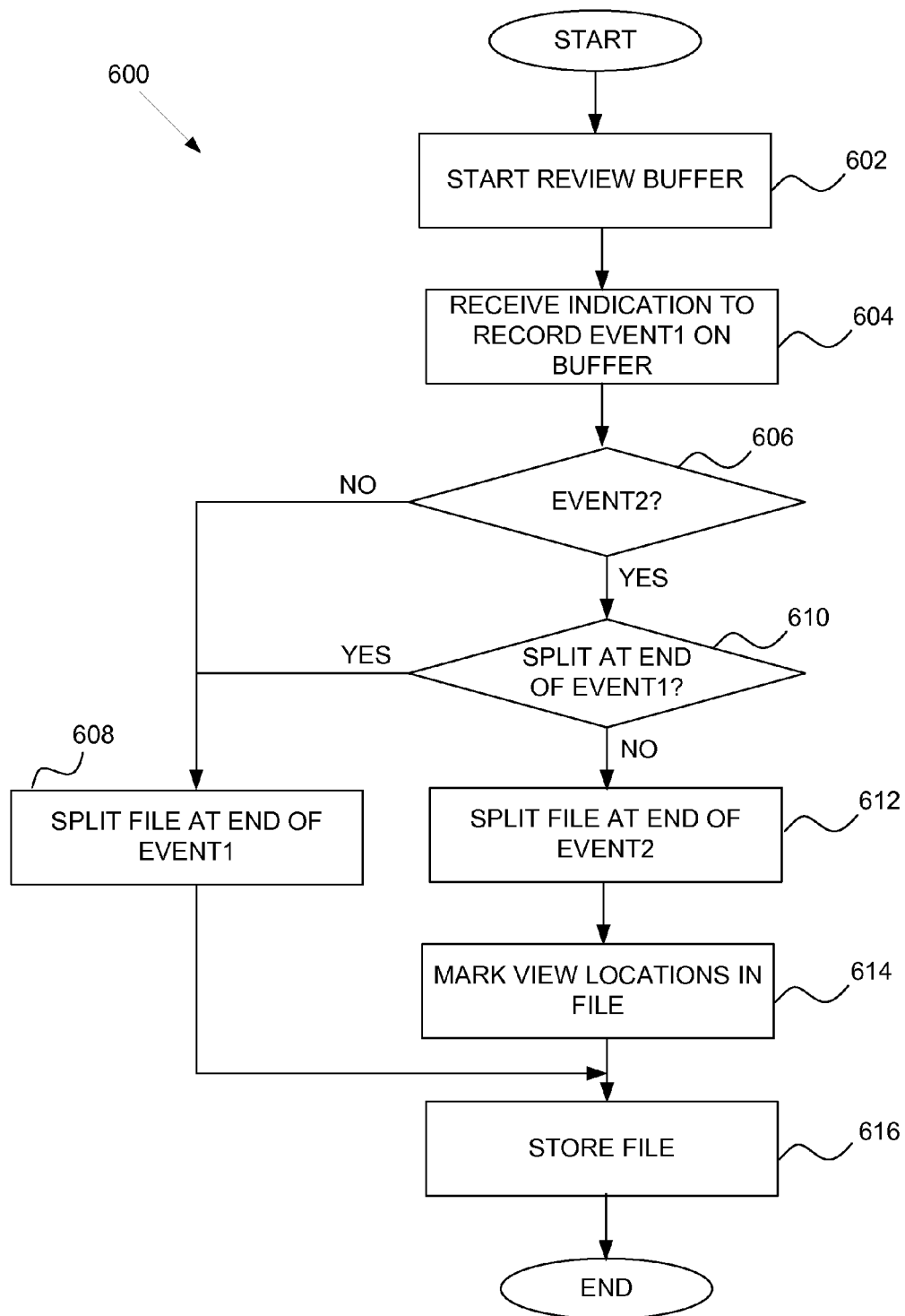
FIG. 6 is a flow diagram of an example method for generating a recording from a review buffer.

FIG. 6 is a flow diagram of an example method 600 for generating a recording from a review buffer. The review buffer is a temporary recording of what the user is watching that provides views of past events for a predetermined amount of time (e.g., 2 hours). In operation 602, a review buffer starts to record. Typically, the review buffer starts to record as soon as a user starts to view an event and continues to record (typically on a same channel) until the user stops viewing. A length of the review buffer may correspond to a predetermined length of time (e.g., 2 hours).

In operation 604, an indication to record a first event (event1) is received. Accordingly, the recording module 402 may receive the indication or request to record event1. As long as event1 is within a window of the review buffer (e.g., within the 2 hour length of time of the review buffer), the recording module 402 may trigger the recording of event1.

A determination may be made at operation 606 as to whether a second event (event2) is also indicated to be recorded. If no event2 is indicated to be recorded, then at operation 608, a file that contains a view of event1 may be split off or detached from the review buffer. In example embodiments, the file is split off, with appropriate padding, at a point after the review buffer advances beyond an end of event1.

If, however, event2 is also requested to be recorded in operation 606, then a further determination may be made at operation 610 as to whether to split a file at an end of event1 or event2. For example, if there is a huge gap in time between event1 and event2 (e.g., 1.5 hours of another event in between), the recording module 402 may determine that it would be more efficient to split a first file after the end of event1 and create a second file (by splitting a second file off of the review buffer) that only contains event2. Accordingly, if at operation 610, it is determined to split the file at the end of event1, then the method 500 proceeds to operation 608 where the file is split from the review buffer at a point after the end of event1 with appropriate padding.

However, if the determination at operation 610 is to not split the file at the end of event1, then at operation 612, the file may be split from the review buffer at a point after an end of event2. Views that correspond to event1 and event2 (with appropriate padding if required) may be marked in the file in operation 614 by inserting view markings. It is noted that, in various embodiments, the view markings may be inserted (e.g., by the recording module 402) at any time before or after the splitting of the file from the review buffer. The file is stored to the file storage 408 in operation 616.

Figure 7:
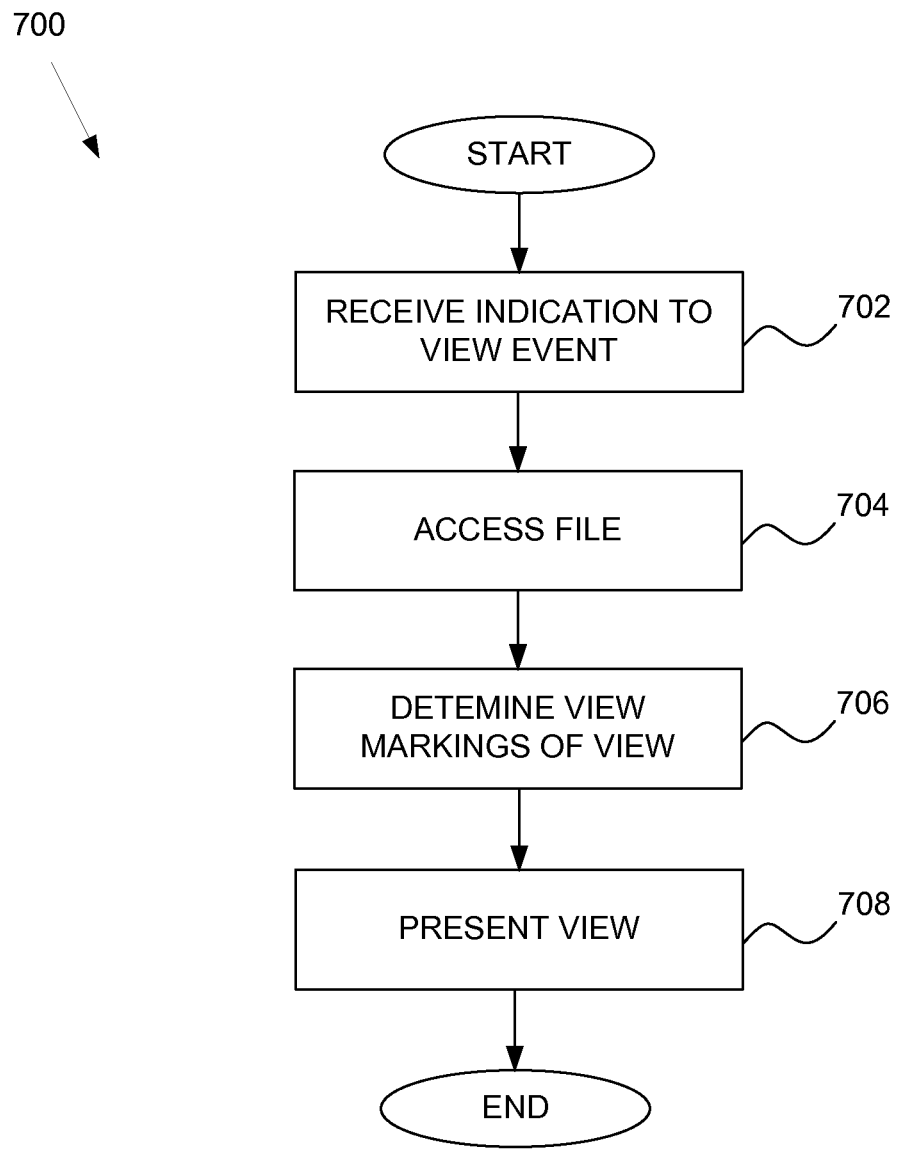
FIG. 7 is a flow diagram of an example method for presenting a view from a stored file that contains multiple views.

FIG. 7 is a flow diagram of an example method 700 for presenting a view from a stored file that contains multiple views. The operations of the method 700 may be performed by the view module 406. In operation 702, an indication to view a recorded event is received. For example, the view module 406 may receive a request to view the recorded event. In operation 704, a file that corresponds to the recorded file is accessed from the file storage 408.

In operation 706, view markings of a view that corresponds to the recorded event are determined. Because the file contains more than one recorded event, the file is marked with viewing markings that indicate where each view in the file begins and ends (sometimes with appropriate padding). The view module 406 determines or identifies the view using these view markings. In operation 708, the view is presented to the user by the view module 406.

Example embodiments allow multiple events on a same channel to be recorded in a single file using a single tuner. As such, there is no need for hardware to shared one tuner input with several output files. Additionally, any number of views may be created and stored within a single stream or file; there is no hardware limitation. By recording within a single file or splitting a file from a recording buffer, there is reduced stress on CPU and hardware since there is no need to record/duplicate overlapping segments (e.g., padding) on the same channel nor is there a need to copy large amounts of data to create a new file. The elimination of overlapping recordings also reduces storage space requirements. Accordingly, one or more of the methodologies discussed herein may provide the technical effect of reducing computing resources used by one or more devices within the system. Examples of such computing resources include, without limitation, processor cycles, memory usage, storage space, and power consumption.

Figure 8:
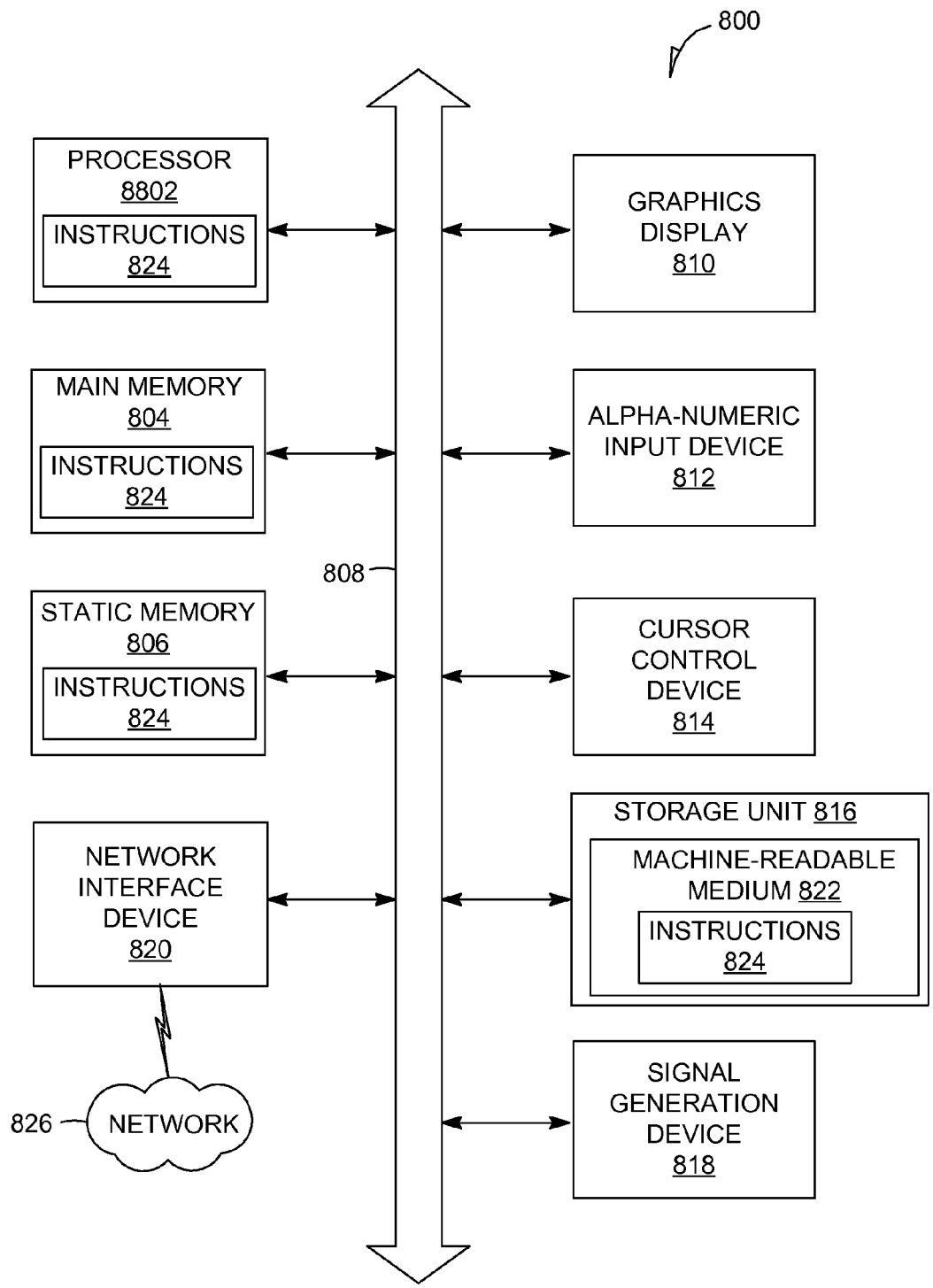
FIG. 8 is a simplified block diagram of a machine in an example form of a computing system within which a set of instructions for causing the machine to perform any one or more of the methodologies discussed herein may be executed.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system and within which instructions 824 (e.g., software, a program, an application, an applet, an app, or other executable code) for causing the machine 800 to perform any one or more of the methodologies discussed herein may be executed. In alternative embodiments, the machine 800 operates as a stand-alone device or may be connected (e.g., networked) to other machines. In a networked deployment, the machine 800 may operate in the capacity of a server machine or a client machine in a server-client network environment, or as a peer machine in a peer-to-peer (or distributed) network environment. The machine 800 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 824, sequentially or otherwise, that specify actions to be taken by that machine. Further, while only a single machine is illustrated, the term "machine" shall also be taken to include a collection of machines that individually or jointly execute the instructions 824 to perform any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The machine 800 may further include a graphics display 810 (e.g., a plasma display panel (PDP), a light emitting diode (LED) display, a liquid crystal display (LCD), a projector, or a cathode ray tube (CRT)). The machine 800 may also include an alpha-numeric input device 812 (e.g., a keyboard), a cursor control device 814 (e.g., a mouse, a touchpad, a trackball, a joystick, a motion sensor, remote control device, or other pointing instrument), a storage unit 816, a signal generation device 818 (e.g., a speaker), and a network interface device 820.

The storage unit 816 includes a machine-readable medium 822 on which is stored the instructions 824 embodying any one or more of the methodologies or functions described herein. The instructions 824 may also reside, completely or at least partially, within the main memory 804, within the processor 802 (e.g., within the processor's cache memory), or both, during execution thereof by the machine 800. Accordingly, the main memory 804 and the processor 802 may be considered as machine-readable media. The instructions 824 may be transmitted or received over a network 826 via the network interface device 820.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 822 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 800), such that the instructions (e.g., instructions 824), when executed by one or more processors of the machine (e.g., processor 802), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 824 may further be transmitted or received over a communications network 826 using a transmission medium via the network interface device 820 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMAX networks). The term "transmission medium" shall be taken to include any intangible medium that is capable of storing, encoding, or carrying instructions for execution by the machine 800, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms.

Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
receiving an indication to record a plurality of events including a first event and a second event on a same channel;
starting a recording stream that includes a front padding added to a beginning of the first event;
inserting, using a hardware processor, view markings in the recording stream that differentiate a first view corresponding to the first event from a second view corresponding to the second event, the inserting the view markings comprising:
adding padding to an end of the first event in the recording stream, and
adding padding to a beginning of the second event in the recording stream;
stopping the recording stream at an end of the second event, the stopping of the recording stream including adding padding to the end of the second event, the recording stream creating a single file that contains multiple views; and
storing the single file for later playback.

2. The method of claim 1, further comprising condensing the recording by removing a third event located between the first event and the second event from the recording.

3. The method of claim 1, wherein at least the padding added to the end of the first event of the first view and the padding added to the beginning of the second event of the second view overlap.

4. The method of claim 1, further comprising:
receiving a request to view the first event;
accessing the single file that contains the first event;
determining the view markings in the recording stream that differentiate the first view corresponding to the first event; and
causing presentation of the first view to the user.

5. The method of claim 1, wherein the inserting of the view markings occurs on-the-fly during a recording of the recording stream.

6. A system comprising:
one or more hardware processors configured by instructions stored in a memory device to perform operations comprising;
receiving an indication to record a plurality of events including a first event and a second event on a same channel;
starting a recording stream that includes a front padding added to a beginning of the first event;
inserting view markings in the recording stream that differentiate a first view corresponding to the first event from a second view corresponding to the second event, the inserting the view markings comprising:
adding padding to an end of the first event in the recording stream, and
adding padding to a beginning of the second event in the recording stream;
stopping the stream at end of the second event, the stopping of the recording stream including adding padding to the end of the second event; and
storing the single file for later playback, the recording stream creating a single file that contains multiple views.

7. The system of claim 6, wherein the recording is condensed by removing a third event located between the first event and the second event from the recording.

8. The system of claim 6, wherein at least the padding added to the end of the first event of the first view and the padding added to the beginning of the second event of the second view overlap.

9. The system of claim 6, wherein the operations further comprise:
receiving a request to view the first event;
accessing the single file that contains the first event;
determining the view markings in the recording stream that differentiate the first view corresponding to the first event; and
causing presentation of the first view to the user.

10. The system of claim 6, wherein the inserting the view markings occurs on-the-fly during a recording of the recording stream.

11. A machine-readable medium having no transitory signals and comprising instructions that when executed by one or more processors of a machine, cause the machine to perform operations comprising:
receiving an indication to record a plurality of events including a first event and a second event on a same channel;
starting a recording stream at includes a front padding added to a beginning of the first event;
inserting view markings in the recording stream that differentiate a first view corresponding to the first event from a second view corresponding to the second event, the inserting the view markings comprising:
adding padding to an end of the first event in the recording stream, and
adding padding to a beginning of the second event in the recording stream;
stopping the recording stream at an end of the second event, the stopping of the recording stream including adding padding to the end of the second event, the recording stream creating a single file that contains multiple views; and
storing the single file for later playback.

12. The machine-readable medium of claim 11, wherein the operations further comprise condensing the recording by removing a third event located between the first event and the second event from the recording.

13. The machine-readable medium of claim 11, wherein at least the padding added to the end of the first event of the first view and the padding added to the beginning of the second event of the second view overlap.

14. The machine-readable medium of claim 11, wherein the operations further comprise:
receiving a request to view the first event;
accessing the single file that contains the first event;
determining the view markings in the recording stream that differentiate the first view corresponding to the first event; and
causing presentation of the first view to the user.

15. The machine-readable medium of claim 11, wherein the inserting of the view markings occurs on-the-fly during a recording of the recording stream.

16. A system comprising:
- means for receiving an indication to record a plurality of events including a first event and a second event on a same channel;
- means for starting a recording stream that includes a front padding added to a beginning of the first event;
- means for inserting view markings in the recording stream that differentiate a first view corresponding to the first event from a second view corresponding to the second event, the means for inserting the view markings comprising:
  - means for adding padding to an end of the first event in the recording stream, and
  - means for adding padding to a beginning of the second event in the recording stream;
- means for stopping the recording stream at an end of the second event, the means for stopping the recording stream further adding padding to the end of the second event, the recording stream creating a single file that contains multiple views; and
- means for storing the single file for later playback.

17. The system of claim 16, further comprising means for condensing the recording by removing a third event located between the first event and the second event from the recording.

18. The system of claim 16, wherein at least the padding added to the end of the first event of the first view and the padding added to the beginning of the second event of the second view overlap.

19. The system of claim 16, further comprising:
- means for receiving a request to view the first event;
- means for accessing the single file that contains the first event;
- means for determining the view markings in the recording stream that differentiate the first view corresponding to the first event; and
- means for causing presentation of the first view to the user.

20. The system of claim 16, wherein the means for inserting the view markings inserts the view markings on-the-fly during a recording of the recording stream.

* * * * *

UNITED STATES PATENT AND TRADEMARK OFFICE
CERTIFICATE OF CORRECTION

PATENT NO. : 9,570,112 B2
APPLICATION NO. : 14/136721
DATED : February 14, 2017
INVENTOR(S) : Willard et al.

Page 1 of 1

It is certified that error appears in the above-identified patent and that said Letters Patent is hereby corrected as shown below:

In the Claims

In Column 12, Line 1, in Claim 6, delete "the stream at" and insert --the recording stream at an-- therefor In Column 12, Line 33, in Claim 11, delete "at" and insert --that-- therefor Signed and Sealed this
Fourteenth Day of April, 2020

Andrei Iancu
*Director of the United States Patent and Trademark Office*